(12) United States Patent
Karamchedu et al.

(10) Patent No.: US 8,230,517 B2
(45) Date of Patent: *Jul. 24, 2012

(54) OPAQUE MESSAGE ARCHIVES

(75) Inventors: Murali M. Karamchedu, Beaverton, OR (US); Jeffrey B. Sponaugle, Tigard, OR (US)

(73) Assignee: Kryptiq Corporation, Beaverton, OR (US)

( * ) Notice: Subject to any disclaimer, the term of this patent is extended or adjusted under 35 U.S.C. 154(b) by 363 days.

This patent is subject to a terminal disclaimer.

(21) Appl. No.: 11/938,524

(22) Filed: Nov. 12, 2007

(65) Prior Publication Data

US 2008/0065891 A1 Mar. 13, 2008

Related U.S. Application Data

(63) Continuation of application No. 10/394,441, filed on Mar. 20, 2003, now Pat. No. 7,299,357.

(60) Provisional application No. 60/401,945, filed on Aug. 7, 2002.

(51) Int. Cl.
*H04L 9/12* (2006.01)
*G06F 21/20* (2006.01)

(52) U.S. Cl. .......................... 726/29; 713/165

(58) Field of Classification Search .......... 380/278–279, 380/286, 44, 45, 47; 713/171, 185; 726/4–5, 726/9, 20, 28–29

See application file for complete search history.

(56) References Cited

U.S. PATENT DOCUMENTS

| | | | |
|---|---|---|---|
| 5,557,678 A | 9/1996 | Ganesan | |
| 5,588,059 A | 12/1996 | Chandos et al. | |
| 5,748,735 A | 5/1998 | Ganesan | |
| 5,764,772 A | 6/1998 | Kaufman et al. | |
| 5,787,244 A | 7/1998 | Hiratsuka et al. | |
| 5,892,909 A | 4/1999 | Grasso et al. | |
| 5,903,723 A | 5/1999 | Beck et al. | |
| 6,118,874 A | 9/2000 | Okamoto et al. | |
| 6,314,454 B1 | 11/2001 | Wang et al. | |
| 6,332,164 B1 | 12/2001 | Jain | |
| 6,360,252 B1 | 3/2002 | Rudy et al. | |
| 6,490,680 B1 * | 12/2002 | Scheidt et al. | 713/166 |
| 6,609,196 B1 | 8/2003 | Dickinson, III et al. | |

(Continued)

FOREIGN PATENT DOCUMENTS

EP  0 869 652 A  10/1998

(Continued)

OTHER PUBLICATIONS

Microsoft Computer Dictionary, ISBN: 0-7356-1495-4, pp. 236, 259, 328, 329 and 482.

(Continued)

*Primary Examiner* — Venkat Perungavoor
(74) *Attorney, Agent, or Firm* — Schwabe, Williamson & Wyatt, P.C.

(57) ABSTRACT

A system includes a server equipped to generate a split encryption key having at least a first key portion and a second key portion, that is used by the server to encrypt at least a portion of a message. Additionally, the first key portion of the split encryption key is retained by the server, while the second key portion of the split encryption key is delivered to a sending client and is discarded from the server. The sending client in turn provides the second key portion to one or more recipients of the message to facilitate recipient access to the message.

9 Claims, 13 Drawing Sheets

U.S. PATENT DOCUMENTS

| | | | |
|---|---|---|---|
| 6,625,734 B1 * | 9/2003 | Marvit et al. | 726/28 |
| 6,731,755 B1 * | 5/2004 | Cocks | 380/30 |
| 6,885,747 B1 | 4/2005 | Scheidt et al. | |
| 6,901,385 B2 | 5/2005 | Okamoto et al. | |
| 6,959,394 B1 | 10/2005 | Brickell et al. | |
| 7,095,852 B2 * | 8/2006 | Wack et al. | 380/44 |
| 7,146,009 B2 | 12/2006 | Andivahis et al. | |
| 2001/0016875 A1 | 8/2001 | Schwartz et al. | |
| 2001/0034225 A1 | 10/2001 | Gupte et al. | |
| 2002/0007453 A1 | 1/2002 | Nemovicher | |
| 2002/0010746 A1 | 1/2002 | Jilk et al. | |
| 2002/0035476 A1 | 3/2002 | Ryu et al. | |
| 2002/0080970 A1 | 6/2002 | Scheidt et al. | |
| 2002/0107931 A1 | 8/2002 | Singh et al. | |
| 2002/0161775 A1 | 10/2002 | Lasensky et al. | |
| 2003/0007645 A1 | 1/2003 | Ofir | |
| 2003/0026432 A1 * | 2/2003 | Woodward | 380/278 |
| 2003/0039358 A1 | 2/2003 | Scheidt et al. | |
| 2003/0101346 A1 * | 5/2003 | Barron et al. | 713/175 |
| 2003/0147536 A1 * | 8/2003 | Andivahis et al. | 380/277 |
| 2003/0174840 A1 * | 9/2003 | Bogan | 380/277 |
| 2004/0062400 A1 | 4/2004 | Sovio et al. | |
| 2005/0081039 A1 | 4/2005 | Lee et al. | |
| 2005/0160053 A1 | 7/2005 | Okamoto et al. | |
| 2006/0213986 A1 | 9/2006 | Register et al. | |

FOREIGN PATENT DOCUMENTS

| | | |
|---|---|---|
| EP | 0961447 | 12/1999 |
| EP | 1087321 | 3/2001 |
| GB | 2 410 656 A | 8/2005 |
| WO | 98/58332 A | 12/1998 |
| WO | 0117165 | 3/2001 |
| WO | 01/52485 A | 7/2001 |
| WO | 0221413 | 3/2002 |

OTHER PUBLICATIONS

Bruce Schneier, Applied Cryptography, ISBN: 0-471-11709-9, section 2.4.

International Search Report for Application No. PCT/US03/24425, mailed on Dec. 23, 2003.

International Search Report for Application No. PCT/US03/24540, mailed on Dec. 18, 2003.

International Search Report for Application No. PCT/US03/24539, mailed on Oct. 12, 2003.

International Search Report for Application No. PCT/US03/24423, mailed Dec. 19, 2003.

* cited by examiner

```
<!DOCTYPE HTML PUBLIC"-//IETF//DTD HTML//EN">
<html>
<head>
<title>Secure Message from Bob@email.com</title>
</head>
<body bgcolor="FFFFFF">

<p><font size ="3" face="Arial"><strong>
Secure Message</strong></p>
<p><font size ="2" face="Tahoma">
You have received a secure message from
<A href="mailto:Bob@kryptiq.com">Bob@email.com</A>.
<BR><A HREF="https://secure.kryptiq.net/j12/rm.asp?t=REPLY-1259097.0684375:268"> Click
here</A>, to retrieve
this message.

</body>
</html>
```

| SEND | SEND SECURE | DEFINE FORM | 678 |

TO:
SUBJECT:
ATTACHMENT(S):

| Question | Potential Answers | Type of Display | Required? |
|---|---|---|---|
| Please Enter Your Full Name: | - | Text | Y |
| Please Enter Your Age: | - | Text | Y |
| Sex: | Male; Female | Radio | N |
| Do You Smoke? | Yes; No | Radio | Y |
| Who is Your Insurance? | Blue Cross; Blue Shield; Kaiser | Pull-Down | Y |

680

SUBMIT

Figure 6c

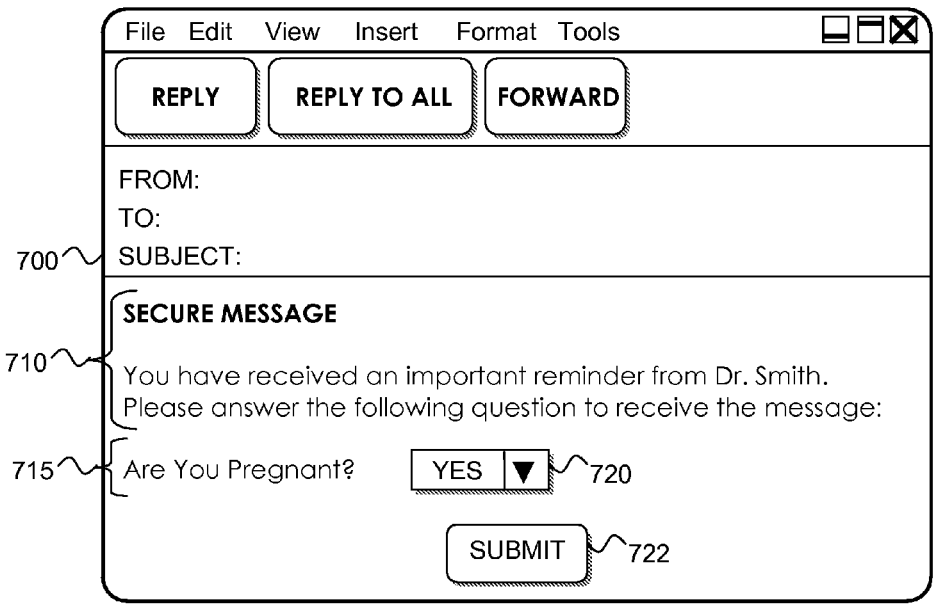

Figure 7a

```
<FORM ACTION = "http://secure.kryptiq.net/j20/rm.asp"
    METHOD = POST>

<P><H1> SECURE MESSAGE </H1></P><BR>
<P><STRONG> You have received an important reminder from Dr.
Smith.  Please answer the following question to receive the message:
<STRONG></P><BR><BR>

<P>Are You Pregnant?
<SELECT NAME = "Pregnant">
<OPTION>Yes
<OPTION>No
</SELECT></P>

<INPUT TYPE = "Submit" NAME="Submit">

</FORM>
```

Figure 7b

OPAQUE MESSAGE ARCHIVES

RELATED APPLICATIONS

The present application is a continuation of U.S. patent application Ser. No. 10/394,441, filed Mar. 20, 2003, entitled "OPAQUE MESSAGE ARCHIVES," and issued as U.S. Pat. No. 7,299,357, which claims to the benefit of provisional U.S. Patent Application No. 60/401,945, entitled "SYSTEM FOR TRANSMITTING RULE BASED STRUCTURES, SEMI-STRUCTURED AND UNSTRUCTURED DOCUMENTS", filed on Aug. 7, 2002. Both applications are hereby fully incorporated by reference.

BACKGROUND OF THE INVENTION

1. Field of the Invention

The present invention relates generally to the field of data processing. More specifically, the present invention relates to a system and method for secure data storage through opaque message archives.

2. Background Information

With advances in integrated circuit, microprocessor, networking and communication technologies, an increasing number of devices, in particular, digital computing devices, are being interconnected. This increased interconnectivity of computing devices has laid the groundwork for a communication infrastructure particularly well suited for electronic communications between such computing devices. More specifically, the increased interconnectivity of computing devices has led to the near ubiquitous adoption of electronic mail (email) as a standard mode of communication.

In the past, electronic mail communications were limited to the exchange of text-based messages between a relatively small populous. Over time, however, email applications and associated communications protocols have become increasingly sophisticated enabling more complex messages to be exchanged between larger numbers of individuals. For example, in addition to enabling the exchange of simple text-messages, many modern day email clients allow users to exchange complex, multipart MIME (Multipurpose Internet Mail Extensions) encoded files as well as a wide variety of binary attachments. Furthermore, with the introduction of web-based email clients that utilize World Wide Web protocols, such as the hypertext transmission protocol (HTTP) for the exchange of messages, access to email has become even more prolific.

Unfortunately, however, with increased email accessibility has come the need for improved security with respect to transmission and storage of messages and data. For example, although many existing email servers attempt to store email messages in a secure manner through techniques such as encryption, the access information needed to decrypt encrypted messages is typically co-located on the same server as the stored messages. Accordingly, anyone who is able to gain access to the storage server, whether it may be a system administrator or an unscrupulous hacker, will have access to the encrypted messages as well as access to the information needed to decrypt those messages. Thus, it should be readily apparent, that by storing the access information necessary to gain access to encrypted data on the same device as the encrypted data itself, the data may be susceptible to unauthorized viewing by anyone who is able to gain access to the storage server, whether sanctioned or otherwise. Furthermore, although many mail servers store secure messages on behalf of senders, even a larger number of mail servers store unsecured messages (and data) on behalf of senders. Accordingly, in the event that an unauthorized access did occur on a message storage server, it may be very difficult for the server operator to prove that a particular message or file was not accessed without authorization.

BRIEF DESCRIPTION OF DRAWINGS

The present invention will be described by way of exemplary embodiments, but not limitations, illustrated in the accompanying drawings in which like references denote similar elements, and in which:

FIG. 5b illustrates example hypertext markup language code corresponding to message notification 550 of FIG. 5a;

FIG. 6a illustrates a graphical representation of a secure message delivery dialog in which a sender can identify a predefined form to be delivered as a secure message to one or more recipients, in accordance with one embodiment of the invention;

FIG. 6b illustrates a graphical representation of an example "Pre-Visit Questionnaire" form as described above with respect to FIG. 6a;

FIG. 6c illustrates a graphical representation of one embodiment of a secure message delivery dialog through which a sender may define a form or notification for post-delivery solicitation of data from one or more recipients;

FIG. 7a illustrates an example message notification incorporating secure pre-delivery email solicitations in accordance with one embodiment of the present invention;

FIG. 7b illustrates example HTML code that might be used to implement the message notification of FIG. 7a in accordance with one embodiment;

DETAILED DESCRIPTION OF EMBODIMENTS OF THE INVENTION

Figure 1:
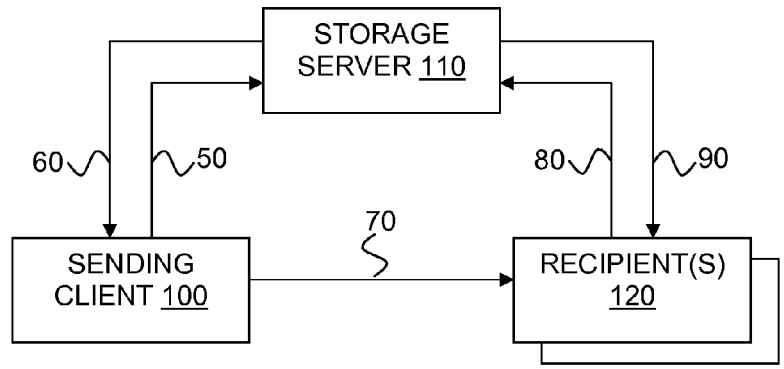
FIG. 1 illustrates an overview of a secure messaging system, including various logical device interactions in accordance with one embodiment of the invention.

In the description to follow, various aspects of the present invention will be described, and specific configurations will be set forth. However, the present invention may be practiced with only some or all aspects, and/or without some of these specific details. In other instances, well-known features are omitted or simplified in order not to obscure the present invention.

The description will be presented in terms of operations performed by a processor based device, using terms such as receiving, determining, rendering, displaying and the like, consistent with the manner commonly employed by those skilled in the art to convey the substance of their work to others skilled in the art. As is well understood by those skilled in the art, the quantities take the form of electrical, magnetic, or optical signals capable of being stored, transferred, combined, and otherwise manipulated through mechanical, electrical and/or optical components of the processor based device.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The description repeatedly uses the phrase "in one embodiment", which ordinarily does not refer to the same embodiment, although it may. Furthermore, the terms "comprising", "including", "having", and the like, as used in the present application, are synonymous.

Overview

In one embodiment, a storage server incorporated with the teachings of the present invention is employed to facilitate users of client devices in sending partially or fully secure email messages to one or more recipients. Similarly, a user (i.e. "sender") of an email client (i.e. "sending client") incorporated with the teachings of the present invention is able to compose an email message to be delivered to one or more recipients in either a fully secured or partially secured manner. Furthermore, the sender may employ one or more predefined or custom generated forms as a basis for the email message and/or a message delivery notification designed to alert the recipient(s) of the availability of the email message and any possible attachments. In one embodiment, a sender may require certain inputs to be entered by an intended recipient of a secure message (whether fully or partially secure), such as passwords or answers to survey questions, before the recipient may be provided with the secure email message. In one embodiment, the sender may elect to have the content of the delivered email be dependent upon the inputs provided by the recipient prior to delivery of the message. In a further embodiment, a split encryption key methodology is utilized in which secure messages or portions of messages are stored in an encrypted form on the storage server in conjunction with only a portion of the access information necessary to access a given secure message.

In the following description including the claims, unless further particularized or otherwise noted, the term "message" is intended to broadly refer to electronic mail messages, attachments and/or data files in whole or in part, whether or not they comprise a text, binary, or otherwise encoded form, and whether or not they are transmitted via the Simple Mail Transport Protocol (SMTP), HTTP, file transfer protocol (FTP), trivial file transfer protocol (TFTP), or otherwise.

FIG. 1 is a logical block diagram illustrating an overview of a secure messaging system in accordance with one embodiment of the present invention. In one embodiment, sending client 100 is equipped with a generic user agent to facilitate the composition and transmission of messages and/or data to one or more recipients 120. In one embodiment, the user agent represents an electronic mail (email) client, such as "Outlook" from Microsoft Corporation or "Notes" from IBM Corporation, equipped to send and receive data and messages via SMTP and/or HTTP. In one embodiment, sending client 100 is further equipped with secure messaging services including message notification and form generation logic to facilitate the exchange of secure messages between sending client 100, storage server 110, and one or more recipients 120, for example. The secure messaging services may be implemented as a plug-in, an application programming interface (API), or executable instructions integrated with or otherwise adjunct to the user agent.

Storage server 110 represents a computing device equipped to receive communication requests from a sending client, and securely store one or more messages and/or data received from or identified by the sending client. In one embodiment, storage server 110 includes secure messaging services to encrypt messages/data on behalf of sending client 110, and to generate one or more encryption keys to facilitate recipient access to the encrypted messages/data. In one embodiment, storage server includes message notification and form generation logic to generate message notifications designed to notify recipients of a message as to the existence of the message on storage server 110.

Recipients 120 represent one or more computing devices equipped with a generic user agent to receive and transmit network messages. In one embodiment, recipients 120 are equipped to receive SMTP based messages, and to both receive and transmit HTTP based requests.

In the illustrated embodiment, sending client 100 transmits a request to storage server 110 to store an identified message (or portion of a message) in a secure manner (50). In one embodiment, the identified message is transmitted to storage server 110 in association with the request, whereas in another embodiment, sending client 100 merely indicates a message that has been previously stored by storage server 110. In one embodiment, in response to the sending client's request (50), storage server 110 securely stores the identified message and generates access data associated with the securely stored message in the form of an access token. In one embodiment, storage server 110 securely stores the message by encrypting the message using a split encryption key having two or more key portions. In one embodiment, storage server 110 retains a first key portion and transmits a second key portion to the sending client. In other embodiments, however, storage server 110 may employ other means of securely storing the message besides encryption.

Once generated, the access token is returned to sending client 100 by storage server 110 (60). In one embodiment, storage server 110 integrates the access token with a message notification before transmitting the integrated notification to sending client 100. In another embodiment, storage server 110 transmits the access token to sending client 100 where the access token is then integrated with a message notification by sending client 100. In various embodiments, the message notification may be selected from one or more predefined notifications or it may be dynamically or manually generated by storage server 110 and/or sending client 100.

Sending client 100 then transmits the integrated notification to one or more of recipients 120 to facilitate recipient access to the message (70). In one embodiment, message notifications are delivered from sending client 100 to one or more recipients 120 in the form of electronic mail messages using an email based communications protocol such as SMTP or X.400. Once a recipient has received a message notification (in e.g. their email inbox), the recipient may open and view the message notification as they would with any other email message. In one embodiment, the recipient may utilize a user input device such as a mouse to select a hyperlink or one or more controls incorporated within the notification to initiate retrieval of one or more corresponding secure messages stored by storage server 110. In one embodiment, the access token is submitted to storage server 110 by one or more of recipients 120 in response to recipient input (80).

In response to receiving the access token from the one or more recipient(s) 120, storage server 110 transmits the corresponding secure message (or a portion thereof) to recipient(s) 120 (90). In one embodiment, communications between sending client 100 and storage server 110, as well as communications between recipients 120 and storage server 110, occur in accordance with a first communication protocol such as HTTP, whereas communications between sending client 100 and recipients 120 occur in accordance with a second communication protocol such as SMTP.

Message and Notification Generation

Figure 2:
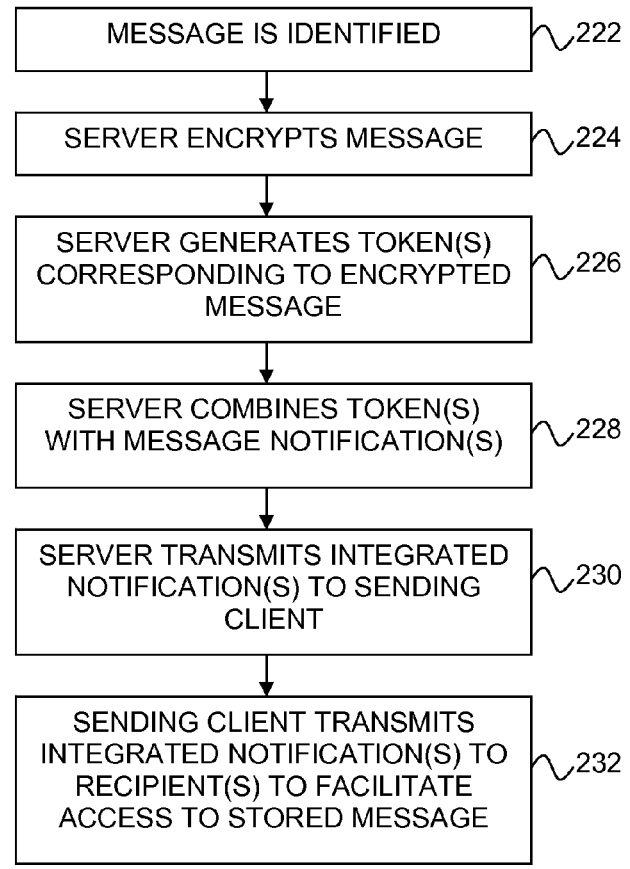
FIG. 2 is a flow diagram illustrating an operational flow for secure message storage and server-based notification generation, in accordance with one embodiment of the invention.

FIG. 2 is a flow diagram illustrating an operational flow for secure message storage and server-based notification generation, in accordance with one embodiment. In the illustrated embodiment, a message that is to be securely stored and delivered to one or more recipients in accordance with the teachings of the present invention is identified (by e.g. sending client 100) to storage server 110, (block 222). In one embodiment, sending client 100 transmits the identified message to storage server 110, whereas in another embodiment, sending client 100 merely identifies the message from amongst one or more messages previously stored by storage server 110. Once the message has been identified to storage server 110, storage server 110 encrypts the message (block 224) and generates one or more access tokens corresponding to the encrypted message (block 226). In one embodiment, each access token includes at least a portion of the access data needed for the one or more indicated recipients to access the message. In one embodiment, a single access token is generated for all recipients, whereas in an alternative embodiment, a recipient individualized access token is generated for each recipient. Storage server 110 then combines the access token(s) with one or more message notifications (block 228). In one embodiment, a single message notification is generated for all recipients, whereas in another embodiment, recipient individualized message notifications are utilized. In one embodiment, storage server 110 combines the access token with an existing message notification, whereas in another embodiment server 110 generates a new message notification with which the token is then combined. Storage server 110 then transmits the token-enhanced (i.e. token integrated) notification to sending client 110 (block 230), where it is further transmitted by sending client 110 to one or more of recipients 120 to facilitate access to the stored secure message by recipient(s) 120 (block 232).

Figure 3:
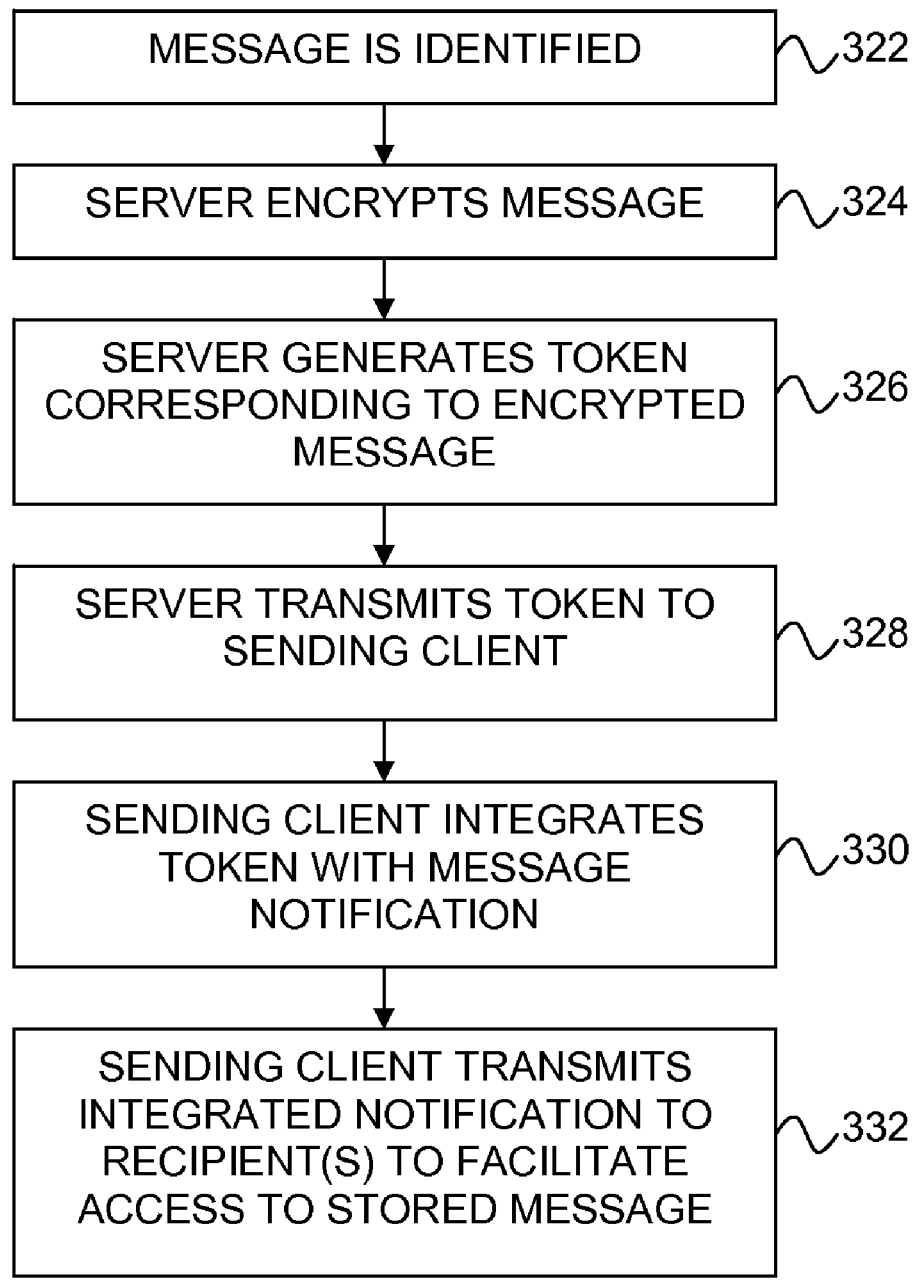
FIG. 3 is a flow diagram illustrating an operational flow for secure message storage and sender-based notification generation, in accordance with one embodiment of the invention.
Figure 4:
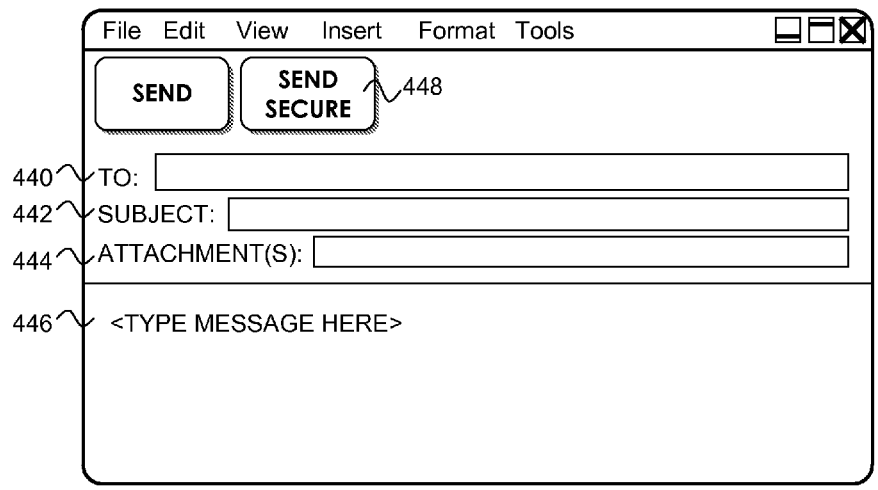
FIG. 4 illustrates a graphical representation of one embodiment of a secure message delivery dialog through which a sender may initiate delivery of a secure message to one or more recipients.

In the process described in FIG. 2, the message notification was described as being generated and integrated with the access token by the server. In an alternative embodiment, the sending client integrates the server-generated access token with a message notification (whether it be pre-existing or dynamically generated). FIG. 3 is a flow diagram illustrating an operational flow for secure message storage and sender-based notification generation, in accordance with one embodiment of the invention. In the illustrated embodiment, a message that is to be securely stored and delivered in accordance with the teachings of the present invention is first identified to storage server 110 (block 322). In one embodiment, sending client 100 transmits the identified message to storage server 110, whereas in another embodiment, sending client 100 identifies the message from amongst one or more messages previously stored by storage server 110. Once the message has been identified by storage server 110, storage server 110 encrypts the message (block 324) and generates one or more access tokens corresponding to the encrypted message (block 326). In one embodiment, the one or more access tokens include at least a portion of the access data needed to access the message. Once an access token is generated, storage server 110 transmits the token back to sending client 100 (block 328) where the token is integrated with a message notification by sending client 100 (block 330). Thereafter, sending client 100 transmits the integrated message notification to one or more designated recipients (block 332) FIG. 4 illustrates a graphical representation of one embodiment of a secure message delivery dialog through which a sender may initiate delivery of a secure message to one or more recipients. The sender may manifest their intent to have a particular message or attachment delivered in a secure manner through one or more graphical icons or controls such as "Send Secure" button 448 as shown in FIG. 4. In the illustrated embodiment, the sender may provide one or more addresses corresponding to one or more of message recipients 120 in the "To" data entry field 440, as well as the subject matter of the message in the "Subject" data entry field 442. In one embodiment, the sender may enter free-form text in message window 446 that may be stored by storage server 110 as part of a secure message, or that may be incorporated as part of a message notification. Additionally, the sender may identify one or more attachments, e.g. via attachment field 444, that are to be securely stored and delivered by storage server 110 in association with the secure message.

In one embodiment, as a result of the sender opting to deliver a message in a secure manner, sending client 100 transmits an HTTP based request to storage server 110 that includes the body of the message and optionally, any attachments that might accompany the message. The request may be characterized by a single exchange between sending client 100 where the message is transmitted to storage server 110 along with the request, or by a series of exchanges between sending client 100 and storage server 110 where the message is transmitted by sending client 100 at some point after an initial connection is established with storage server 110.

Figure 5A:
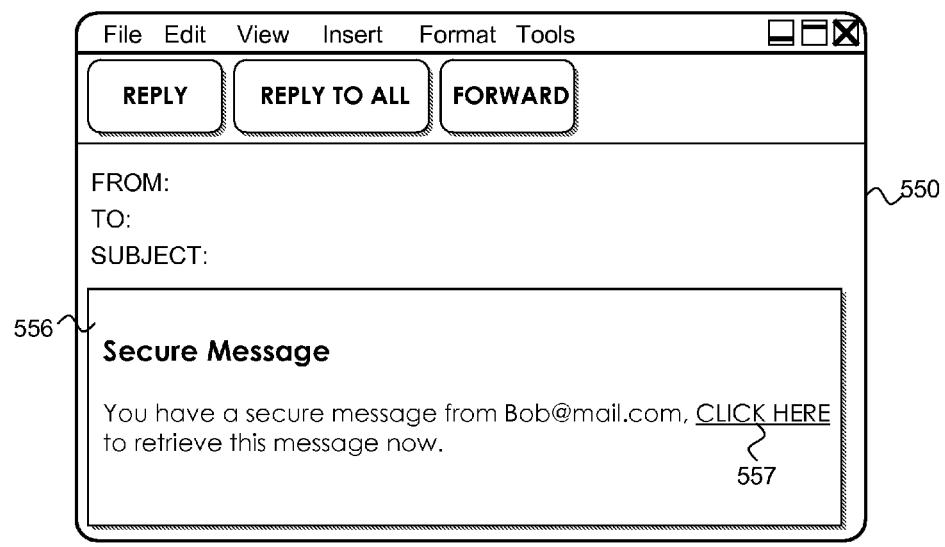
FIG. 5a illustrates a graphical representation of an example message notification designed for delivery to a recipient of a secure message, in accordance with one embodiment of the invention.

In one embodiment of the invention, storage server 110 generates message notifications to notify indicated recipients as to the presence of a secure message awaiting delivery to the recipients. FIG. 5*a* illustrates a graphical representation of an example message notification designed for delivery to a recipient of a secure message, in accordance with one embodiment of the invention. As shown, message notification 550 includes notification window 556 having a text-based notification displayed therein. In the illustrated embodiment, the text based notification includes hyperlink 557, which when selected by a recipient, causes an access token associated with the corresponding secure message to be transmitted to storage server 110.

FIG. 5*b* illustrates example hypertext markup language code corresponding to message notification 550 of FIG. 5*a*. In the illustrated example, upon a recipient selecting hyperlink 557 of FIG. 5a, token 558 is submitted to storage server 110 (as identified by URL 559) via the secure hypertext transmission protocol (HTTPS).

In accordance with one embodiment of the invention, secure message notifications may be selected by e.g. a sender from a group of predefined message notifications or dynamically generated based upon one or more properties or characteristics associated with the corresponding secure message, or based upon metadata that may accompany the message. In one embodiment, a message notification may be based on characteristics such as the identity of the sender or recipients, network domains associated with the sender or recipients, the message subject, the time that the message was sent, length of the message, and so forth. For example, storage server 110 might generate a message notification containing a particular branded logo for each secure message that is transmitted by an employee of a corresponding company/subsidiary. Similarly, storage server 110 might generate a message notification conveying a patriotic "look and feel" that is to be used in conjunction with secure messages transmitted e.g. on July fourth.

Figures 6A, 6B:
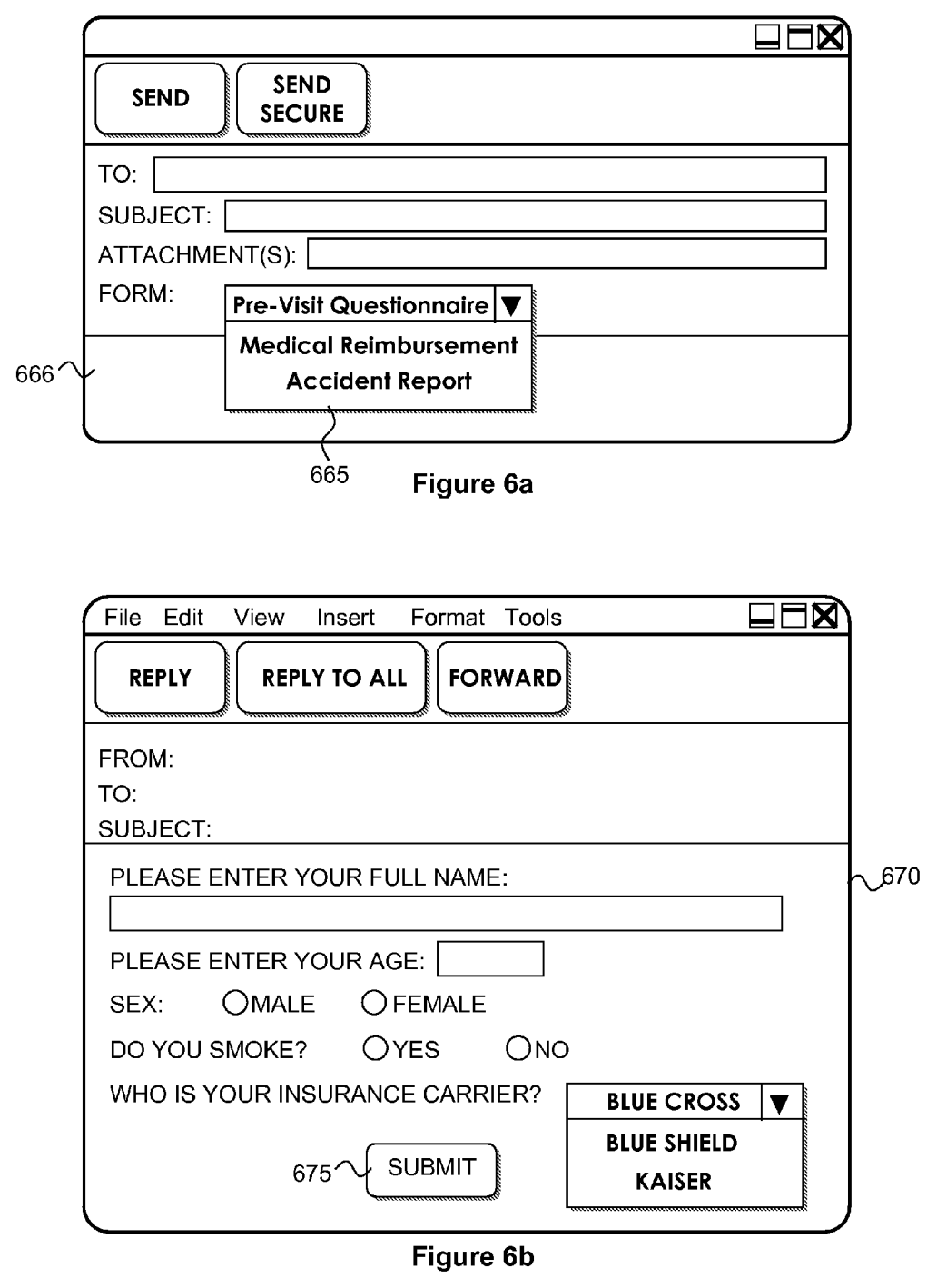

In one embodiment of the invention, storage server 110 contains predefined forms that may be identified for secure delivery to one or more recipients. FIG. 6a illustrates a graphical representation of a secure message delivery dialog in which a sender can identify a predefined form to be delivered as a secure message to one or more recipients, in accordance with one embodiment of the invention. The secure message delivery dialog illustrated in FIG. 6a is similar to the secure message delivery dialog depicted in FIG. 4, except the secure message delivery dialog of FIG. 6a includes form identification facilities, such as pull-down control 665, that includes the names of available forms stored on storage server 110. In one embodiment, the sender may select a predefined form and optionally provide supplemental information (such as text or graphics via e.g. message window 666) to be associated with the form. In one embodiment, storage server 110 may intersperse the supplemental information with the selected form to create a combined secure message to be stored by storage server 110. In another embodiment of the invention, storage server 110 may utilize the supplemental information to generate all or a portion of the message notification associated with the secure message.

FIG. 6b illustrates a graphical representation of an example "Pre-Visit Questionnaire" form as described above with respect to FIG. 6a. As shown, form 670 includes a number of data entry facilities for soliciting post-delivery data from a recipient (i.e. data that is solicited from a recipient after delivery of an associated message). In the illustrated embodiment, form 670 includes a number of graphical controls through which a patient/recipient, for example, can provide information to a doctor/sender regarding an upcoming office visit by the patient to the doctor. In the illustrated embodiment, the patient can provide the requested data and submit the data to storage server 110 by e.g. selecting submit button 675. In one embodiment of the invention, a hidden control is additionally utilized to facilitate submission of recipient individualized information in the form of an access token to the storage server in association with a corresponding form.

In addition to predefined forms, a sender can cause a custom form (or notification) to be generated, whether by the storage server or by the sending client, in order to facilitate post-delivery solicitation of data from one or more message recipients. In one embodiment, a sending client submits metadata to the storage server to facilitate generation of the form by the server.

FIG. 6c illustrates a graphical representation of one embodiment of a secure message delivery dialog through which a sender may define a form or message notification for post-delivery solicitation of data from one or more recipients. In the illustrated embodiment, a sender can initiate the custom form generation process by e.g. selecting a graphical control such as "define form" button 678. In one embodiment, in response to a sender's input, form definition table 680 may be displayed to facilitate entry of definitional metadata by a sender, however other automatic and manual metadata and/or form definition techniques such as hand-coding of HTML may be used.

In one embodiment, form data provided by the sender, such as that provided via table 680, is transmitted to storage server 110, which in turn utilizes the data to generate a corresponding form. In one embodiment, storage server 110 may update or supplement the generated form or form data based upon one or more rules, dependencies or heuristics, for example. After the form has been generated, storage server 110 stores the form in a secure manner and returns at least a portion of the access data corresponding to the form to sending client 100, as described above. Sending client 100 then delivers the access data to one or more recipients 120 in association with a message notification generated by the sending client or the server. The recipient(s) may then retrieve the form using the access data, and provide the solicited information accordingly. In one embodiment, upon provision by the recipients of the solicited for data, the form data is submitted to the server for processing.

In an alternative embodiment, the sending client rather than server 110 uses the form data provided by the sender, such as via table 680, to generate the custom form. The sending client then returns all or a portion of the form to the server for secure storage, and the server returns access information associated with the stored form to the sending client. In one embodiment, the sending client then packages the remaining (i.e. non-secure) portion of the form along with the non-secure information, and delivers the package to the recipients. In one embodiment, portions of a message or document that are going to be encrypted or otherwise stored in a secure manner are stored on the server, whereas messages or portions of a message or document that are to remain non-secure are retained on the sending client.

Pre-Delivery Solicitation

In one embodiment of the invention, a sender may solicit pre-delivery information (i.e. data that is solicited from a recipient before delivery of an associated message) from one or more recipients. In one embodiment, a sender may require that certain inputs, such as passwords or answers to survey questions, be entered by an intended recipient of a secure message before the recipient may be provided with the secure email message. Moreover, in one embodiment, the sender may elect to have the content of the delivered email be dependent upon the inputs provided by the recipient prior to delivery of the message. In one embodiment, the storage server utilizes one or more scripting technologies, such as active server pages (ASP) or common gateway interface (CGI) scripting, to dynamically determine a message or portion of a message to be delivered to one or more identified recipients based upon the inputs provided.

FIG. 7a illustrates an example message notification incorporating secure pre-delivery email solicitations in accordance with one embodiment of the present invention. As shown, message notification 700 includes notification text 710, pre-delivery solicitation 715, and data input controls 720 and 722.

Notification text 710 is designed to notify one or more recipients as to the presence of a secure message available for retrieval by the recipient(s), while pre-delivery solicitation 715 is designed to solicit information from the recipient prior to delivery of the secure message, and data input controls 720 and 722 are designed to facilitate data entry and submission by the recipient(s). In one embodiment, the storage server is equipped to receive the data submission, determine an appropriate message based upon the submission, and deliver the determined message to the recipients accordingly. For example, if a recipient were to indicate through e.g. data input control 720 that they were not pregnant, the server might return a message that reads: "OUR RECORDS INDICATE THAT YOU ARE DUE FOR A VACCINATION BOOSTER SHOT. PLEASE MAKE AN APPOINTMENT WITH OUR OFFICE IMMEDIATELY." On the other hand, if a recipient were to indicate that they were pregnant, the server might return a message that reads: "OUR RECORDS INDICATE THAT YOU ARE DUE FOR A VACCINATION BOOSTER SHOT. HOWEVER, SINCE YOU ARE PREGNANT, YOU MAY WISH TO DELAY THE VACCINATION UNTIL 3 MONTHS AFTER YOUR DELIVERY DATE." Thus, the content of the delivered email can be dependent upon the input provided by the recipient prior to delivery of the stored message.

FIG. 7b illustrates example HTML code that could be used to implement the message notification of FIG. 7a in accordance with one embodiment. As shown in the illustrated embodiment, a FORM element (724) is utilized to gather recipient input data that is then submitted via a POST method (730) to a storage server corresponding to the address (728) associated with the ACTION attribute (726). In the illustrated embodiment, a simple drop-down menu selection is utilized to receive recipient input and return the input to the storage server. In one embodiment, a hidden field may be used to transmit an access token, such as a recipient individualized token or encryption key to the storage server as follows: <INPUT TYPE="hidden" NAME="Token" VALUE="{access token}">. In other embodiments, a wide variety of data input controls and interfaces might be utilized. For example, a sender may require recipients to be authenticated via a password before the recipients are able to retrieve the message.

Figure 7C:
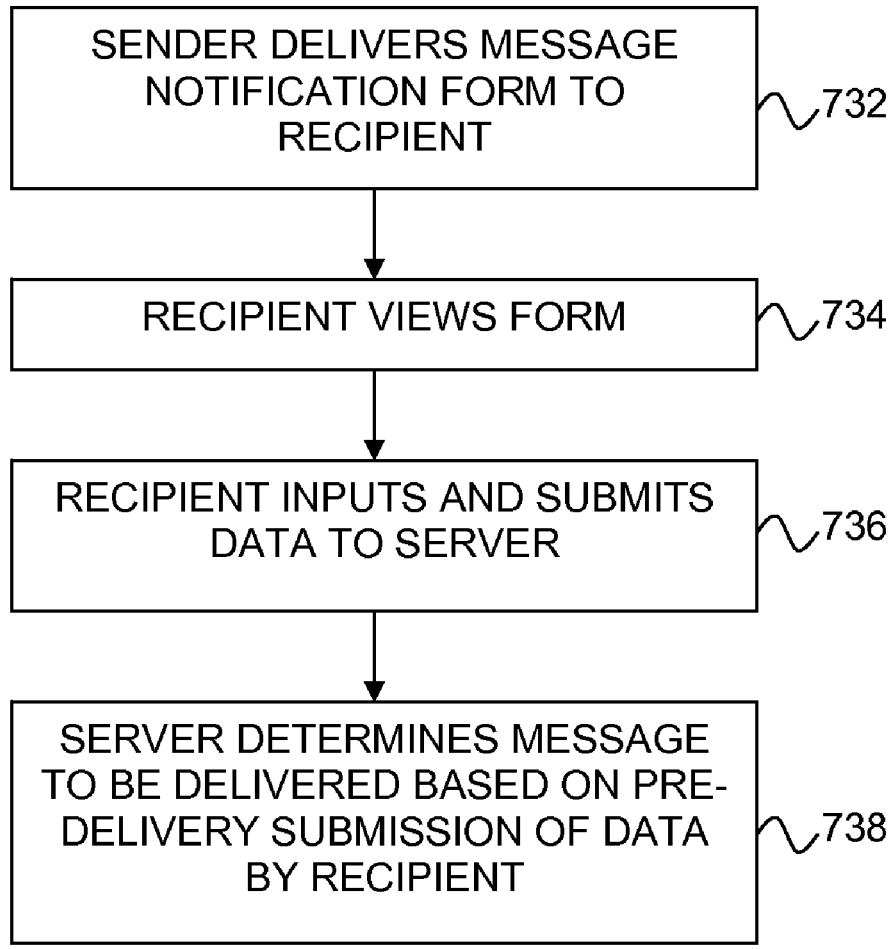
FIG. 7c is a flow diagram illustrating an operational flow for pre-delivery solicitation in accordance with one embodiment of the present invention.

FIG. 7c is a flow diagram illustrating an operational flow for pre-delivery solicitation in accordance with one embodiment of the present invention. In the illustrated embodiment, the process begins with the sender delivering a message notification form including data solicitation facilities to one or more recipients (block 732). In one embodiment, the sending client generates the message notification form, whereas in an alternative embodiment, the storage server generates the message notification. Once the notification is received, the recipient views the form on e.g. a display device (block 734), provides input data in response to the solicitation, and submits the form to the storage server (block 736). In response, the storage server then determines the message to be delivered based on the pre-delivery submission of data by recipient (block 738).

Opaque Archives

As was previously mentioned above with respect to various embodiments of the invention, the storage server of the present invention stores messages and data in a secure manner on behalf of a sender for delivery to one or more recipients. In prior message storage arrangements, where encryption techniques are used to store data on a central server, it was often the case that the access information (such as an encryption key) necessary to access the stored data was stored on the same server as the data. These 'secure storage' schemes are premised on the idea that the storage server itself is secure notwithstanding the fact that server administrators are typically granted full access to the data stored on a managed server, and the fact that server is always susceptible to an attack by a hacker. Because the encrypted files and the access information (such as the encryption keys) necessary to access the files have historically been stored together on the same server, the files stored on such a server are inherently at risk to unauthorized access.

In another aspect of the present invention, a split or partial encryption key methodology is utilized in which a first encryption key portion is retained by the server and a second encryption key portion is delivered to a recipient to facilitate access by the recipient to a corresponding message or other electronic document. In one embodiment of the invention, the server transmits the second encryption key portion to the sending client of the message, which in turn, delivers the second encryption key portion to a recipient in association with a message notification. Although for the purpose of clarity, the following description focuses primarily on an embodiment of the present invention in which two encryption key portions are utilized, the teachings herein may be extended to the use of multiple (i.e. more than two) key portions without departing from the intended spirit and scope of the invention.

Figure 8:
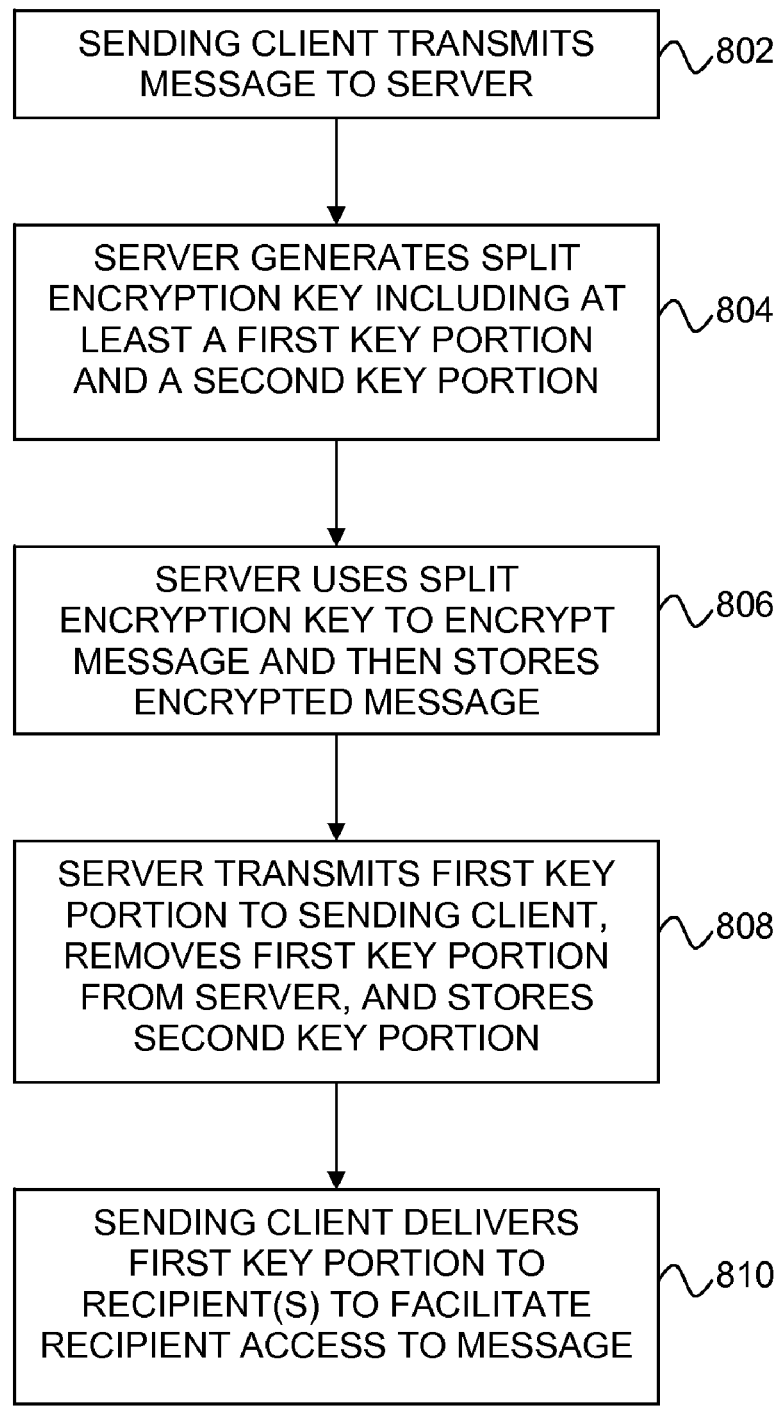
FIG. 8 is a flow diagram illustrating an operational flow for split encryption key storage in accordance with one embodiment of the invention.

FIG. 8 is a flow diagram illustrating an operational flow for split encryption key storage in accordance with one embodiment of the invention. In the illustrated embodiment, the process begins with a sending client transmitting a message (or portion of a message) that is to be stored in a secure manner to a storage server (block 802). In one embodiment, the sending client additionally generates a randomized seed value, such as a globally unique identifier (GUID), and transmits the seed value to the storage server in association with the message. However, in other embodiments, the storage server may itself generate the randomized seed value or alternatively, no seed value need be used. Once the message has been received, the storage server then generates a split encryption key including at least a first encryption key portion and a second encryption key portion (block 804). In one embodiment, one or more hash functions are applied to the randomized seed value to generate the first and second encryption key portions, which when combined, form the split encryption key. In an alternative embodiment, a first hash function is used to generate a single encryption key that is then bifurcated into the first encryption key portion and the second encryption key portion. Next, the storage server uses the split encryption key to encrypt and store the message (block 806). Once the message has been encrypted, the storage server transmits the first key portion to the sending client, removes the first key portion from the server, and stores the second key portion (block 808). In turn, the sending client transmits the first key portion to one or more designated recipients to facilitate recipient access to and decryption of the stored and encrypted message (or portion of message) (block 810).

Figure 9:
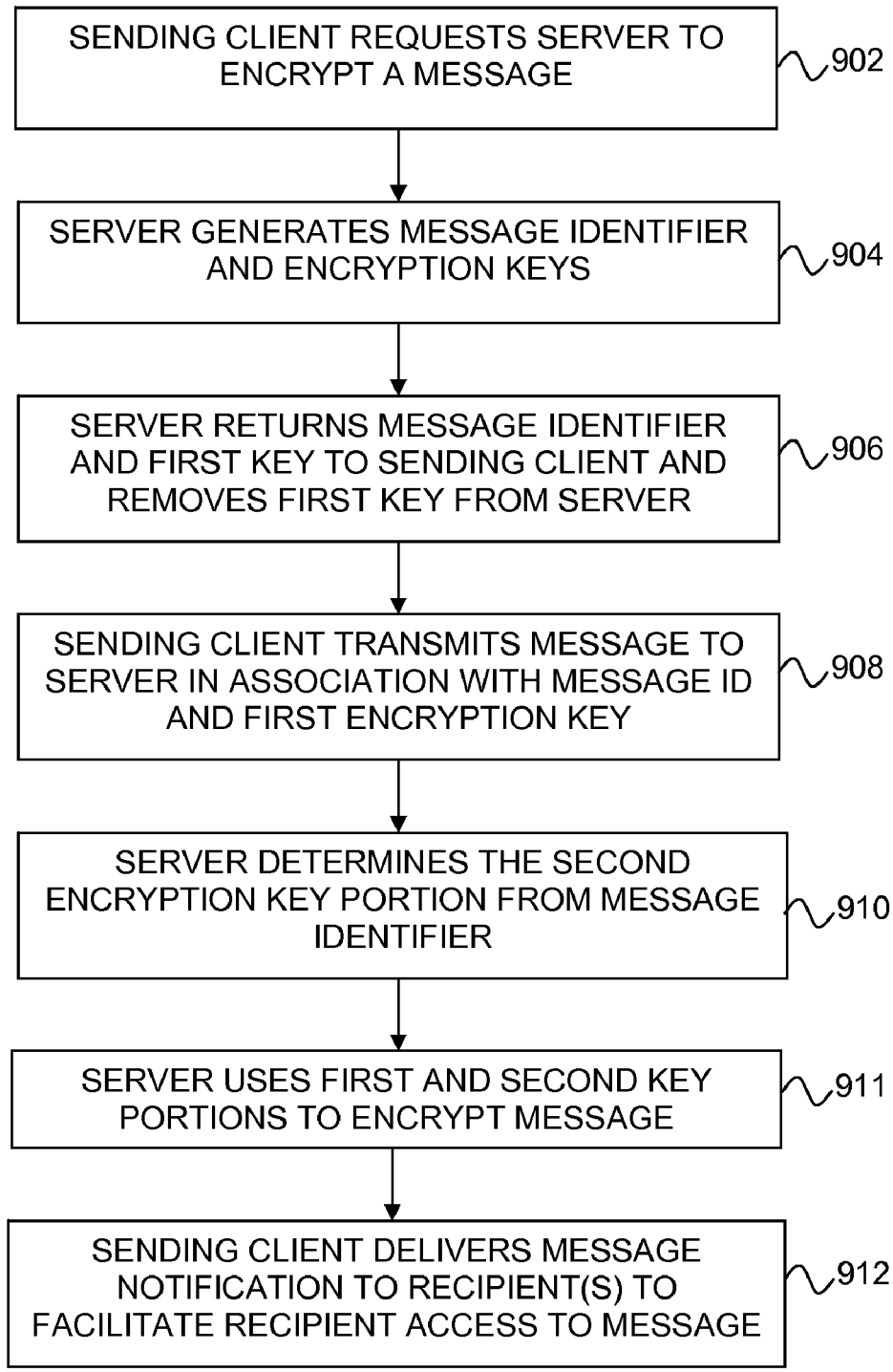
FIG. 9 is a flow diagram illustrating an operational flow for split encryption key storage in accordance with an alternative embodiment of the invention.

FIG. 9 is a flow diagram illustrating an operational flow for split encryption key storage in accordance with an alternative embodiment of the invention. In the illustrated embodiment, the process begins with the sending client requesting the storage server to encrypt a message or a portion of a message. In one embodiment, the request may be accompanied by a variety of metadata to be used by the storage server in conjunction with the message encryption process. For example, the metadata may be used by the storage server to facilitate message notification generation and/or form generation, rule definitions, data dependencies and/or heuristic definitions, and so forth. In one embodiment, the request may further include a randomized seed value such as a GUID.

After receiving the request, the server generates a message identifier to be associated with and to uniquely identify the message. Additionally, the server generates a split encryption key including at least a first key portion and a second key portion to be used to encrypt the message (block 904). In one embodiment, the message identifier represents a randomized seed value received in association with the sending client's request. In one embodiment, the storage server generates one recipient-individualized token for each recipient identified or enumerated to the storage server by the sending client. In one embodiment, each individualized token is associated with the message identifier and includes an obfuscated combination of the first encryption key portion and a recipient individualized identifier, in which the recipient individualized identifier may e.g. represent an email address or other means of differentiating one recipient from another.

The storage server then returns the message identifier and the first encryption key portion to the sending client, and removes the first encryption key portion from the storage server (block 906). In one embodiment, the storage server also returns the one or more recipient individualized tokens to the sending client. In response, the sending client transmits the message to the storage server in association with the message identifier and the first encryption key portion (block 908). The storage server then compares the message identifier received from the sending client with one or more message identifiers known to the storage server in order to identify/determine the second encryption key portion associated with the message identifier(s) and, in turn, the message (block 910). The storage server then uses the first and second encryption key portions to encrypt and store the message (block 911). Additionally, the sending client delivers a message notification, including at least the first encryption key portion, to one or more intended recipients to facilitate recipient access to the stored message (block 912). In one embodiment, the message notification (whether generated in whole or in part by the sending client or the storage server) includes a recipient individualized token.

In one embodiment, each recipient access is logged by the storage server and associated with the message identifier. In one embodiment, the sending client deposits the message identifier and the first encryption key portion into one or more of the sending client's mail folders, such as a sent mail folder, for use e.g. in obtaining log information about the associated message such as whether a recipient has read the message or forwarded to message to another recipient.

Example Client System

Figure 10:
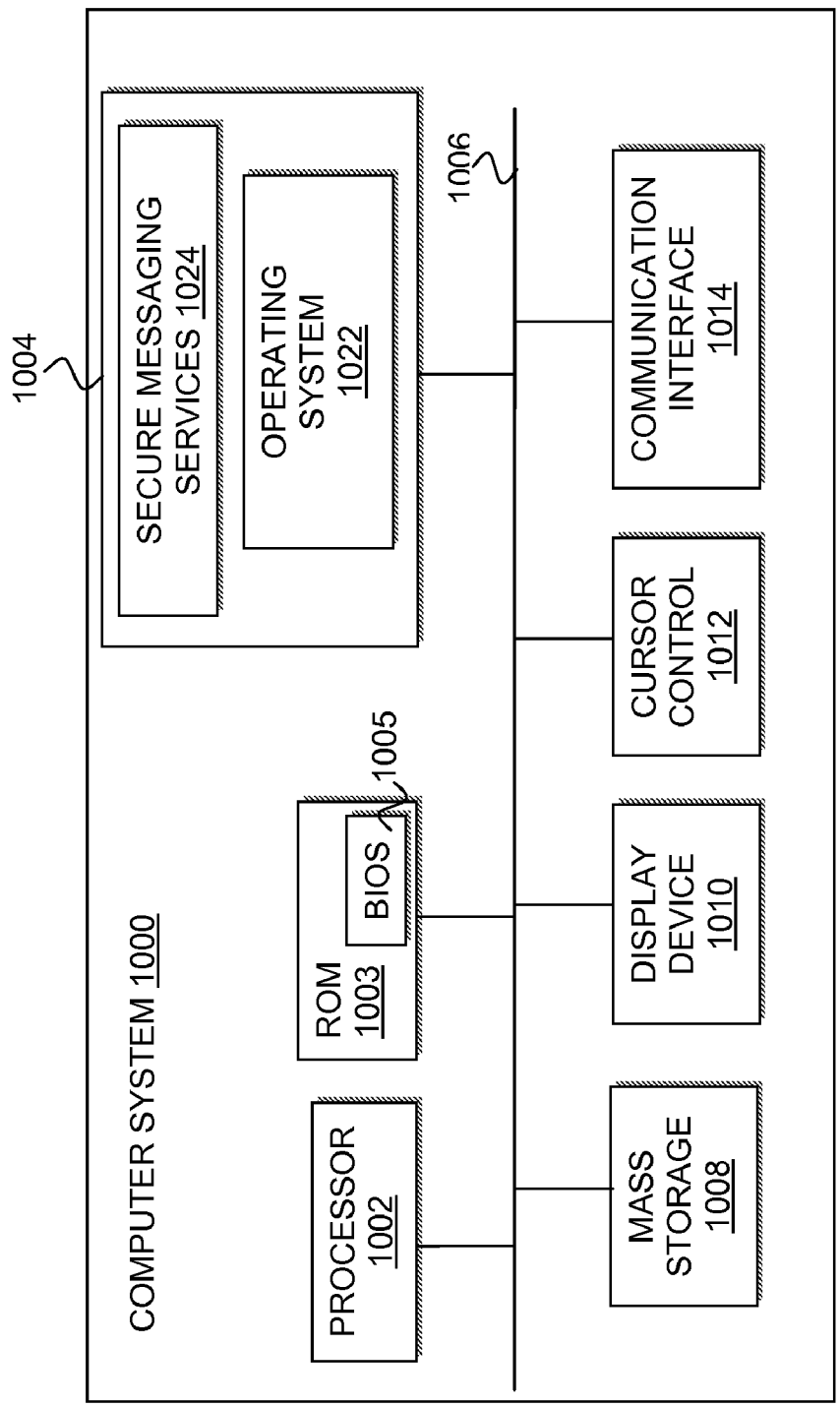
FIG. 10 illustrates an example computer system suitable for use as a sending client or storage server for practicing the present invention.

FIG. 10 illustrates an example computer system suitable for use as a sending client or storage server in accordance with the teachings of the present invention. As shown, example computer system 1000 includes processor 1002, ROM 1003 including basic input/output system (BIOS) 1005, and system memory 1004 coupled to each other via "bus" 1006. Also coupled to "bus" 1006 are non-volatile mass storage 1008, display device 1010, cursor control device 1012 and communication interface 1014. During operation, memory 1004 may include working copies of operating system 11022, and secure messaging services 11024. In the case of the sending client, secure messaging services 11024 include message notification and form generation logic of the present invention to facilitate the exchange of secure messages between a sending client, storage server, and one or more recipients. In the case of a storage server, messaging services 11024 facilitate storage and encryption of messages/data on behalf of sending client, and the generation of one or more encryption keys to facilitate recipient access to the encrypted messages/data.

Except for the teachings of the present invention as incorporated herein, each of these elements may represent a wide range of these devices known in the art, and otherwise performs its conventional functions. For example, processor 1002 may be a processor of the Pentium® family available from Intel Corporation of Santa Clara, Calif., which performs its conventional function of executing programming instructions of operating system 11022 and secure messaging services 11024, including those implementing the teachings of the present invention. ROM 1003 may be EEPROM, Flash and the like, and memory 1004 may be SDRAM, DRAM and the like, from semiconductor manufacturers such as Micron Technology of Boise, Id. Bus 1006 may be a single bus or a multiple bus implementation. In other words, bus 1006 may include multiple properly bridged buses of identical or different kinds, such as Local Bus, VESA, ISA, EISA, PCI and the like.

Mass storage 1008 may represent disk drives, CDROMs, DVD-ROMs, DVD-RAMs and the like. Typically, mass storage 1008 includes the permanent copy of operating system 11022 and secure messaging services 11024. The permanent copy may be downloaded from a distribution server through a data network (such as the Internet), or installed in the factory, or in the field. For field installation, the permanent copy may be distributed using one or more articles of manufacture such as diskettes, CDROM, DVD and the like, having a recordable medium including but not limited to magnetic, optical, and other mediums of the like.

Display device 1010 may represent any of a variety of display types including but not limited to a CRT and active/passive matrix LCD display, while cursor control 1012 may represent a mouse, a touch pad, a track ball, a keyboard, and the like to facilitate user input. Communication interface 1014 may represent a modem interface, an ISDN adapter, a DSL interface, an Ethernet or Token ring network interface and the like.

Enterprise-Based Opaque Archives

Figure 11:
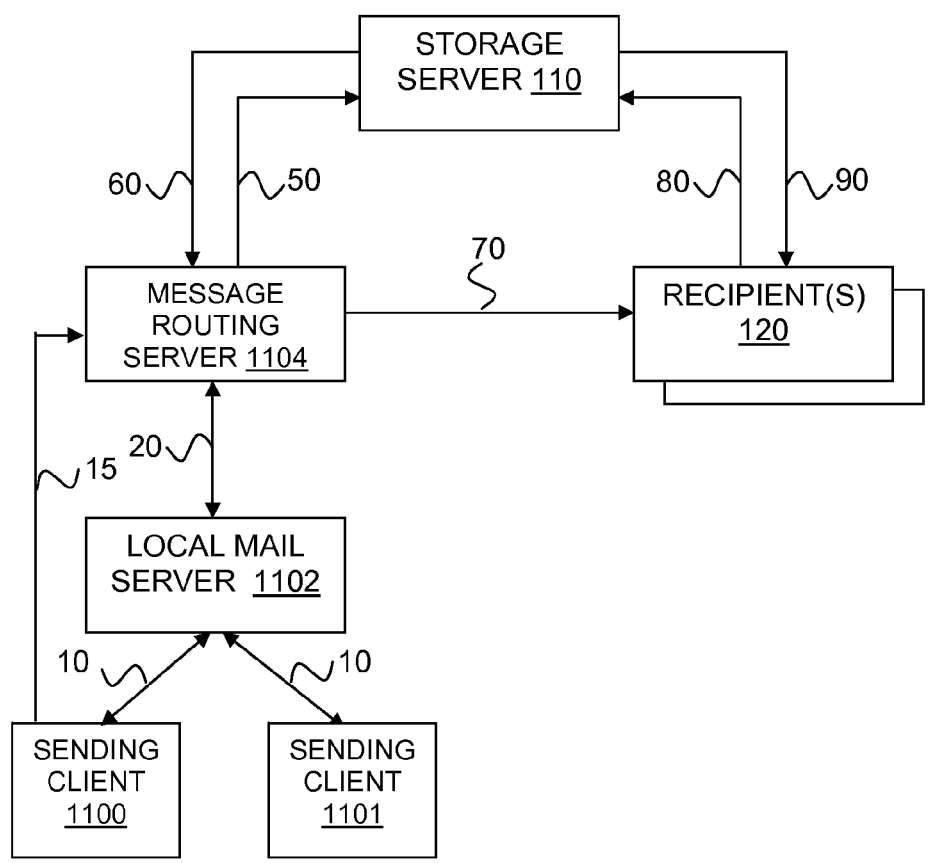
FIG. 11 illustrates an enterprise based secure messaging system including various logical device interactions, in accordance with one embodiment of the invention.

In accordance with a further aspect of the invention, an enterprise based secure messaging system will now be described. FIG. 11 illustrates an enterprise based secure messaging system including various logical device interactions, in accordance with one embodiment of the invention. The enterprise based messaging system of FIG. 11 is similar in form to the messaging system of FIG. 1, except that message routing server 1104 and local mail server 1102 have been inserted between sending client 1100 and 1101 and storage server 110. In accordance with one embodiment of the invention, local mail server 1102 represents a server equipped with electronic mail services, such as those provided by Exchange from Microsoft Corporation or Domino from IBM Corporation, to receive outgoing message transmission requests from clients 1100 and 1101, to receive incoming messages to be delivered to clients 1100 and 1101, and to temporarily store or queue both the outgoing and incoming messages until such time that the message destination domains/devices can be determined and contacted.

Message routing server 1104 represents a server that routes mail traffic from local mail server 1102 (and sending clients 1100 and 1101) to storage server 110 and recipients 120, much like a mail gateway. In one embodiment, outgoing messages from local mail server 1102 are first directed to message routing server 1104 before they are delivered to storage server 110 or recipients 120. In one embodiment, message routing server 1104 proxies the functionality of sending client 100 of FIG. 1.

In one embodiment of the invention, a sender corresponding to either sending client 1100 or 1101 composes an SMTP-based electronic mail message addressed to one or more recipients 120, that is first delivered to local mail server 1102 (10). In one embodiment, local mail server 1102 unconditionally transmits (e.g. via redirection or forwarding) messages it receives to message routing server 1104, whereas in another embodiment, mail server 1102 may transmit messages to message routing server 1104 based upon whether or not the message is to be stored and delivered in a secure manner by storage server 110. In another embodiment of the invention, sending client 1100/1101 transmits an HTTP-based request directly (e.g. via a browser application) to message routing server 1104 identifying the message to be securely stored and delivered, effectively bypassing local mail server 1102 (15).

In one embodiment of the invention, message routing server 1104 determines (based e.g. upon a variety of criteria such as source or destination address, content of the message, size of the message . . . etc.) whether a particular message is to be stored and delivered by storage server 110 in a secure manner. In one embodiment, the SMTP or HTTP-based message includes an identifier (e.g. in an associated header field) that indicates to message routing server 1104 whether the message is to be securely stored and delivered in accordance with the teachings of the present invention.

If it is determined that an identified message is to be securely stored and delivered, message routing server 1104 transmits a request to storage server 110 to store the identified message (or portion of a message) securely (50). In one embodiment, in response to the request of message routing server 1104, storage server 110 securely stores the identified message and generates access data associated with the securely stored message. In one embodiment, the access data is represented by an access token that may include just the access data or supplemental information in addition to the access data. In one embodiment, storage server 110 encrypts the message using a split encryption key having two or more key portions, with storage server 110 retaining a first key portion and transmitting a second key portion to the sending client. In other embodiments, however, storage server 110 may employ other means of securely storing the message besides encryption.

Once generated, the access token is returned to message routing server 1104 by storage server 110 (60). In one embodiment, storage server 110 combines/integrates the access token with a message notification and transmits the integrated message notification to message routing server 1104. In another embodiment, storage server 110 transmits the access token to message routing server 1104 where message routing server 1104 integrates the access token with a message notification. In various embodiments, the message notification may be selected from one or more predefined notifications or it may be dynamically or manually generated by storage server 110 and/or message routing server 1104. In one embodiment, where multiple such message routing servers are utilized by various subsidiaries of a parent company for example, each message routing server can be configured to generate subsidiary-specific notifications notwithstanding that the message routing servers are each associated with the same storage server.

Once the access token is returned to message routing server 1104, message routing server 1104 transmits the integrated notification to one or more of recipients 120 to facilitate recipient access to the message (70). In one embodiment, message notifications are delivered from message routing server 1104 to one or more recipients 120 in the form of an electronic mail messages using an email based communications protocol such as SMTP or X.400. Once a recipient has received a message notification in e.g. their email inbox, the recipient may open and view the message notification as they would with any other email message. In one embodiment, the recipient may utilize a user input device such as a mouse to select a hyperlink or one or more controls incorporated within the notification to initiate retrieval of one or more corresponding secure messages stored by storage server 110. In one embodiment, the token is submitted to storage server 110 by one or more of recipients 120 in response to recipient input (80).

In response to receiving the access token from the one or more recipients 120, storage server 110 then transmits the corresponding secure message (or a portion thereof) to one or more indicated recipients 120 (90). In one embodiment, communications between message routing server 1104 and storage server 110, as well as communications between recipients 120 and storage server 110, occur in accordance with a first communication protocol such as HTTP, whereas communications between message routing server 1104 and recipients 120 occur in accordance with a second communication protocol such as SMTP.

In one embodiment, in addition to storage server 110 returning the access token to message routing server 1104 (60), storage server 110 further returns one or more control parameters or instructions to message routing server 1104 to indicate whether any 'post-processing' in association with the message is to be performed. In one embodiment, storage server 110 returns one or more control parameters or instructions to message routing server 1104 to cause message routing server (e.g. via local mail server 1102 or directly) to return a message to sending client 1100/1101 that includes an access token to facilitate client 1100/1101 in accessing information as to the status of the corresponding message. In one embodiment, message routing server 1104 returns a message identifier (described above with respect to Opaque Archives) and the first encryption key portion to the sending client 1100/1101 for use e.g. by the sender in obtaining log information about the associated message such as whether a recipient has read the message or forwarded to message to another recipient.

Due to the influx of unsolicited email messages (or SPAM) that has proliferated throughout the Internet, many mail servers have been configured to perform what are referred to as reverse domain name service (or reverse DNS) lookups. Each of these lookups typically entails a mail server determining the identity of a sending client through examination of data contained within or indicated by the "to" field appearing in the message header. The mail server then compares the address or domain corresponding to the determined sending client with the network address of the device from where the message originates (e.g. as determined by the address associated with the device that opened the SMTP port connection). If the two addresses/domains differ, the receiving mail server assumes the message has been relayed without authorization, designates the message as SPAM and rejects the message accordingly.

Figure 12:
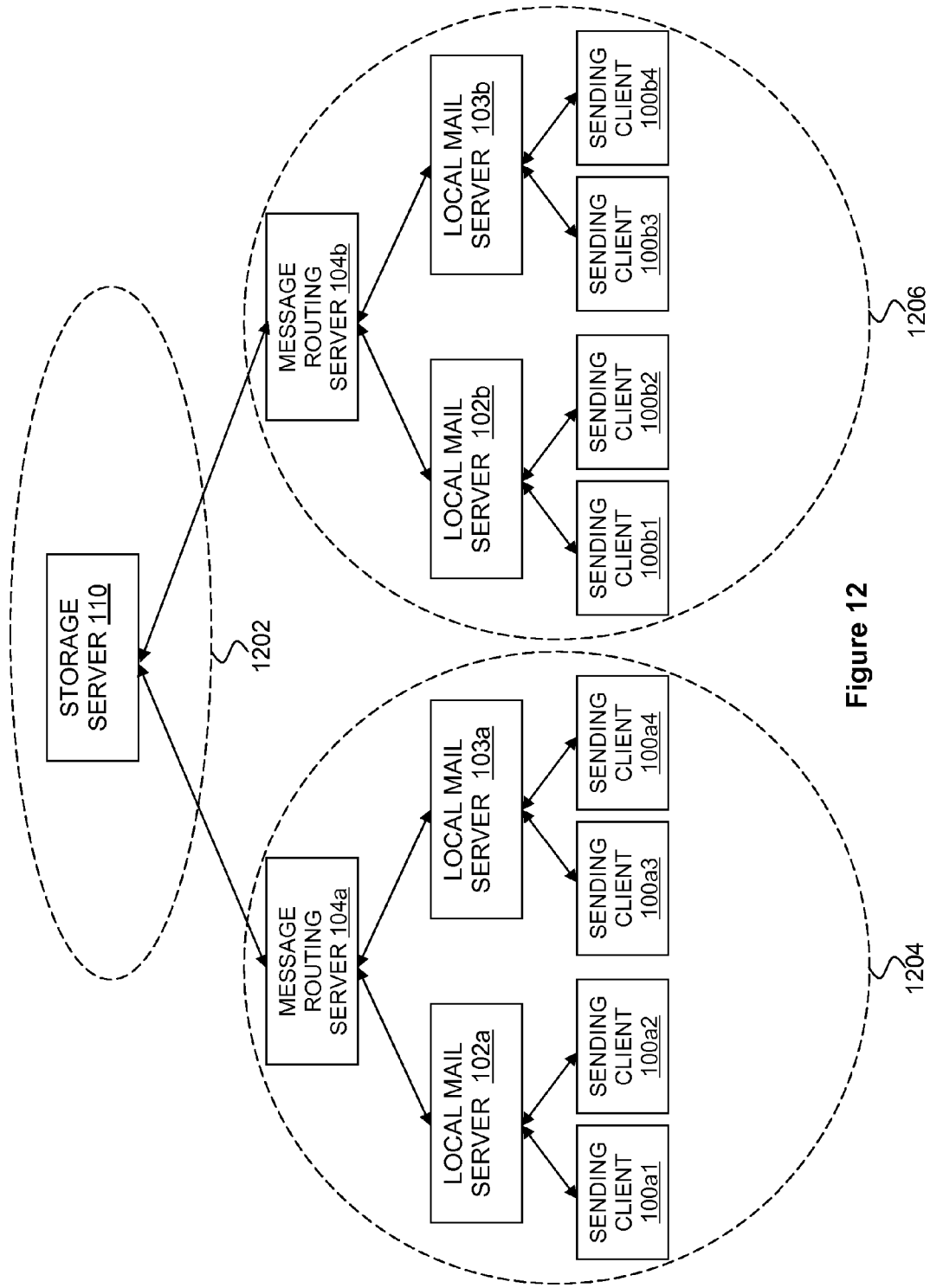
FIG. 12 illustrates domain relationships between a storage server and multiple message routing servers within a secure messaging system in accordance with one embodiment of the invention.

To facilitate delivery of the message delivery notifications to recipients behind certain firewalls for example, without each notification being characterized as SPAM, each message routing server 1104 is co-located within the same domain of the sending client it supports. FIG. 12 illustrates domain relationships between a storage server and multiple message routing servers within a secure messaging system in accordance with one embodiment of the invention. As shown, storage server 110 located in network domain 1202 is communicatively coupled to message routing servers 1104a-b. Each of message routing servers 1104a-b is in turn communicatively coupled to local mail servers 1102a-b and 103a-b, and sending clients 100a1-a4 and 100b1-b4. Message routing server 1104a is co-located with local mail servers 1102a and 103a, and sending clients 100a1-a4, within domain 1204, and message routing server 1104b is co-located with local mail servers 1102b and 103b, and sending clients 100b1-b4 within network domain 1206. Because message notifications are transmitted (e.g. via message routing server 1104a-b) from the same domain from which they originate (e.g. via sending clients 100a1-a4 and 100b1-b4), a reverse DNS lookup performed on an associated message will not cause the message to be rejected by the receiving system.

Epilog

While the present invention has been described in terms of the above-illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A method comprising:
  receiving, by a server, at least a first unencrypted portion of a message from a sending client device;
  generating, by the server, a split encryption key comprising at least a first key portion and a second key portion;
  encrypting, by the server, at least the received first unencrypted portion of the message, using the split encryption key to produce an encrypted portion of the message;
  providing, by the server, the first key portion to the sending client device, and thereafter, discarding the first key portion from the server;
  storing, by the server, the encrypted portion of the message and the second key portion in storage accessible to the server;
  receiving back, by the server, the first key portion; and
  decrypting, by the server, the stored encrypted portion of the message for provision to a recipient client device using the received-back first key portion and the stored second key portion to recover the first unencrypted portion of the message.

2. A method comprising:
  sending to a server, by a client device, at least a first unencrypted part of a message generated by the sending client device for secured storage and subsequent provision to a recipient client device;
  receiving from the server, by the client device, a first key portion of a split encryption key used in conjunction with a second key portion of the split encryption key by the server to encrypt the first unencrypted part of the message, wherein the second key portion is retained in storage accessible to the server while the first portion is discarded from the server;
  wherein:
    encryption of the first unencrypted part of the message on the server using the split encryption key generates an encrypted part of the message;
    the encrypted part of the message is stored in the storage accessible to the server; and
    the discarded first key portion is subsequently provided back to the server for use in conjunction with the retained second key portion to recover the first unencrypted part of the message for provision to the recipient client device; and
  sending the first key portion to the recipient client device to facilitate access by the recipient client device to the first unencrypted part of the message from the server.

3. The method of claim 2, wherein the first key portion is generated by the server based at least in part upon a randomized seed value.

4. The method of claim 3, wherein the randomized seed value is generated by the sending client device.

5. The method of claim 3, wherein the randomized seed value is generated by the server.

6. The method of claim 2, further comprising:
  depositing, by the sending client device, the first key portion into a mail folder on the sending client device.

7. A system comprising:
  a server equipped to:
    receive an unencrypted message from a sending client device;
    generate a split encryption key comprising at least a first key portion and a second key portion;
    encrypt the received unencrypted message, using the split encryption key to produce an encrypted message;
    store an encrypted version of the unencrypted message and the first key portion;
    provide the second key portion to the sending client device;
    discard the second key portion from the server;
    receive back the second key portion; and
    decrypt the stored encrypted version of the unencrypted message for provision to a recipient client device using the received-back second key portion and the stored first key portion to recover the unencrypted message; and
  the sending client device equipped to:
    receive the second key portion from the server; and
    provide the second key portion to a recipient client device to facilitate access to the unencrypted message by the recipient client device.

8. An article comprising:
  a non-transitory computer-readable storage medium having stored therein programming instructions that, in response to being executed by a computing device, cause the computing device to:
    generate a split encryption key comprising at least a first key portion and a second key portion;
    receive, from the sending client device, at least a first unencrypted portion of a message;
    encrypt at least the received first unencrypted portion of the message, using the split encryption key to generate an encrypted portion of the message;
    provide the first key portion to the sending client device, and thereafter, discarding the first key portion from the device;
    store the encrypted portion of the message and the second key portion;
    receive back the first key portion; and
    decrypt the stored encrypted portion of the message for provision to a recipient client device using the received-back first key portion and the stored second key portion to recover the first unencrypted portion of the message.

9. An article comprising:

a non-transitory computer-readable storage medium having stored therein programming instructions that, in response to being executed by a computing device, cause the computing device to:

send, to a server, at least a first unencrypted part of a message generated by the apparatus for secured storage and subsequent provision to a recipient client device;

receive, from the server, a first key portion of a split encryption key used in conjunction with a second key portion of the split encryption key by the server to encrypt the first unencrypted part of the message, wherein the second key portion is retained in the server while the first portion is discarded from the server;

wherein:

encryption of the first unencrypted part of the message on the server using the split encryption key generates an encrypted part of the message;

the encrypted part of the message is stored on the server; and the discarded first key portion is subsequently provided back to the server for use in conjunction with the retained second key portion to recover the first unencrypted part of the message for provision to the recipient client device; and send the first key portion to the recipient client device to facilitate access by the recipient client device to the first unencrypted part of the message from the server.

\* \* \* \* \*